United States Patent
Brosset et al.

(10) Patent No.: US 11,371,561 B2
(45) Date of Patent: Jun. 28, 2022

(54) TRANSMISSION HOUSING, AND VEHICLE EQUIPPED WITH SUCH A HOUSING

(71) Applicant: FRANCE REDUCTEURS, Les Herbiers (FR)

(72) Inventors: Jean-Luc Brosset, La Verrie (FR); Sebastien Bray, Les Epesses (FR)

(73) Assignee: FRANCE REDUCTEURS, Les Herbiers (FR)

( * ) Notice: Subject to any disclaimer, the term of this patent is extended or adjusted under 35 U.S.C. 154(b) by 0 days.

(21) Appl. No.: 16/755,495

(22) PCT Filed: Oct. 2, 2018

(86) PCT No.: PCT/FR2018/052422
§ 371 (c)(1),
(2) Date: Apr. 10, 2020

(87) PCT Pub. No.: WO2019/077221
PCT Pub. Date: Apr. 25, 2019

(65) Prior Publication Data
US 2021/0207658 A1 Jul. 8, 2021

(30) Foreign Application Priority Data
Oct. 16, 2017 (FR) ...................................... 17 59652

(51) Int. Cl.
*F16C 35/073* (2006.01)
*F16H 55/36* (2006.01)
(Continued)

(52) U.S. Cl.
CPC ........... *F16C 35/073* (2013.01); *F16H 55/36* (2013.01); *F16H 57/0025* (2013.01); *F16H 57/039* (2013.01); *F16H 2057/0213* (2013.01)

(58) Field of Classification Search
CPC .... F16C 35/073; F16H 55/36; F16H 57/0025; F16H 57/036; F16H 2057/0213
See application file for complete search history.

(56) References Cited

U.S. PATENT DOCUMENTS 1,381,178 A * 6/1921 Fjellman ................... F16H 7/20
384/546
2,238,435 A * 4/1941 Perry ..................... F16C 27/066
403/225

(Continued)

FOREIGN PATENT DOCUMENTS

DE   10 2010 040891   3/2012
GB   646 869          11/1950

OTHER PUBLICATIONS

International Search Report dated Jan. 10, 2019.
Search Report dated Jul. 8, 2018.

*Primary Examiner* — Daniel D Yabut
(74) *Attorney, Agent, or Firm* — Ipsilon USA, LLP

(57) ABSTRACT

A transmission housing (1) comprising a shaft (2) housed at least partially inside the housing (1) and, mounted on said shaft (2), at least one rotary element (3) and a rolling bearing (4), the rolling bearing (4) comprising an inner ring (5) and an outer ring (6) that are coaxial, separated from each other by rolling members (7). The housing (1) further comprises a blind or through tubular body (8) mounted on the shaft (2) and interposed at least partially between the shaft (2) and the rotary element (3), the rotary element (3) being mounted rotatably secured to the tubular body (8), and the tubular body (8) being kept rotatably secured to the shaft (2) by the inner ring (5), referred to as the constriction ring, of the rolling bearing (4), force-fitted onto said tubular body (8).

11 Claims, 6 Drawing Sheets

(51) Int. Cl.
*F16H 57/00* (2012.01)
*F16H 57/039* (2012.01)
*F16H 57/021* (2012.01)

(56) References Cited

U.S. PATENT DOCUMENTS

| | | | | |
|---|---|---|---|---|
| 3,806,215 | A | * | 4/1974 | Price ......................... F16D 1/08 |
| | | | | 384/538 |
| 5,564,995 | A | | 10/1996 | Roder et al. |
| 2002/0139210 | A1 | * | 10/2002 | Blanchard ................. F16H 1/16 |
| | | | | 74/425 |
| 2005/0066758 | A1 | * | 3/2005 | Marcell ................... F16H 57/02 |
| | | | | 74/425 |
| 2005/0259905 | A1 | * | 11/2005 | Hansen ................ F16C 35/073 |
| | | | | 384/538 |

\* cited by examiner (PRIOR ART)

FIG 4 b
FIG 4 c
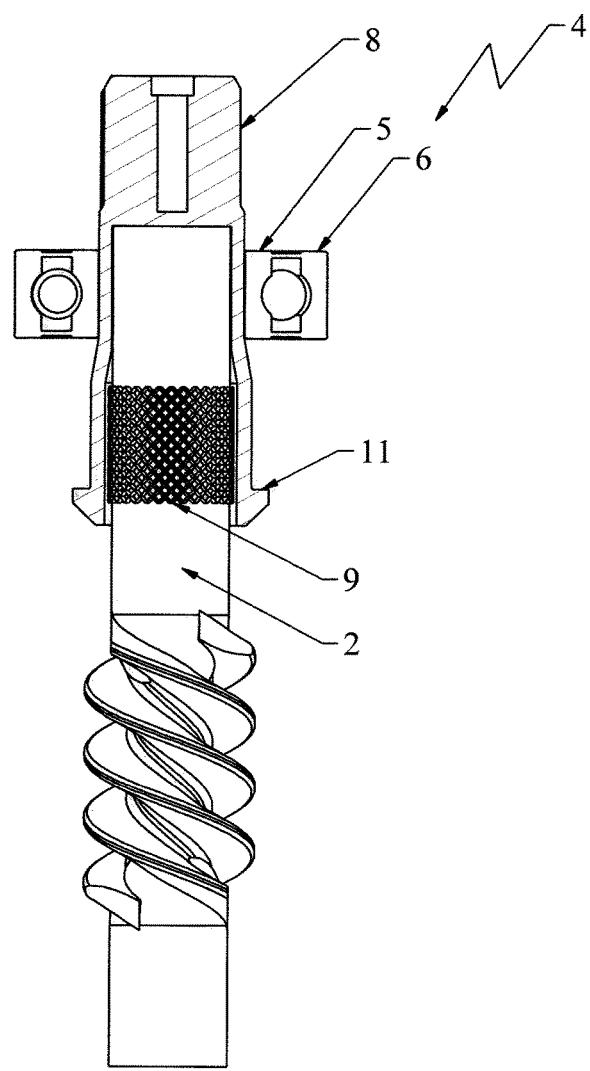
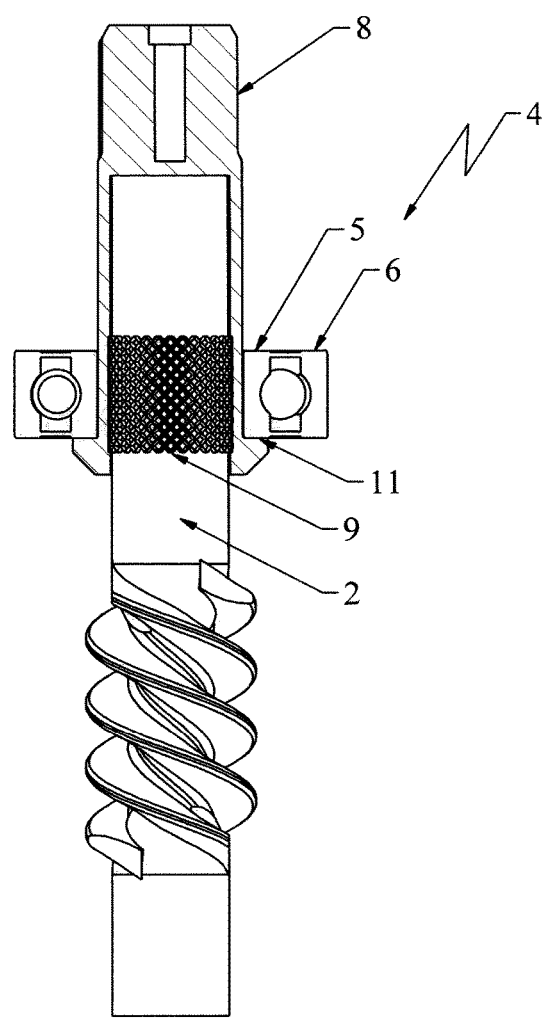

TRANSMISSION HOUSING, AND VEHICLE EQUIPPED WITH SUCH A HOUSING

RELATED APPLICATION

This application is a National Phase of PCT/FR2018/052422 filed on Oct. 2, 2018, which in turn claims the benefit of priority from French Patent Application No. 17 59652 filed on Oct. 16, 2017, the entirety of which are incorporated by reference.

FIELD OF THE INVENTION

The invention relates to a transmission housing and to a machine equipped with such a housing.

It relates more particularly to a transmission housing comprising a shaft housed at least partially within the housing and, mounted on said shaft, at least one rotary element and a bearing, the bearing comprising an inner ring and an outer ring which are coaxial and separated from one another by rolling members, the housing additionally comprising a blind or through tubular body mounted on the shaft and interposed at least partially between the shaft and the rotary element, this rotary element being mounted so as to be locked in rotation with the tubular body.

PRIOR ART

A transmission housing of the aforementioned type is known as illustrated in FIG. 1 or in document U.S. Pat. No. 5,564,995. In such a housing, the shaft is made of metal and requires precise machining in order, on the one hand, to allow secure positioning, in the fitted state, of the bearing on the shaft, since otherwise premature wear of the bearing surfaces of the bearing and/or of the shaft is observed, and, on the other hand, to axially immobilize the shaft. Likewise, another machining, such as a drilling, of the shaft is necessary for mounting the rotary element and the shaft such that they are locked in rotation. These machining operations are laborious and sources of error.

AIM AND SUMMARY

One aim of the invention is to propose a transmission housing of the aforementioned type whose design makes it possible to dispense with at least some of the machining operations carried out on the shaft in the prior art.

To this end, one subject of the invention is a transmission housing comprising a shaft housed at least partially within the housing and, mounted on said shaft, at least one rotary element and a bearing, the bearing comprising an inner ring and an outer ring which are coaxial and separated from one another by rolling members, the housing additionally comprising a blind or through tubular body mounted on the shaft and interposed at least partially between the shaft and the rotary element, this rotary element being mounted so as to be locked in rotation with the tubular body, characterized in that the tubular body is held locked in rotation with the shaft by the inner ring, termed constrictive ring, of the bearing, which inner ring is force-fitted onto said tubular body.

The presence of a tubular body interposed between the shaft and the rotary element, on the one hand, and the bearing, on the other hand, makes it possible to simplify the design of the shaft.

According to one embodiment of the invention, the shaft has on the outside, at least at its portion surrounded by the bearing, recessed and/or raised patterns.

These recessed or raised patterns form attachment means between the tubular element and the shaft to limit the risks of a relative movement between the shaft and the tubular element.

According to one embodiment of the invention, the bearing is axially immobilized within the housing.

Preferably, the outer ring of the bearing is, for axial immobilization of the bearing within the housing, arranged in an axially fixed manner within a receptacle of the housing.

According to one embodiment of the invention, the tubular body is provided at one of its ends with an outer peripheral shoulder able to form an end-of-travel stop for fitting the inner ring of the bearing, in the state in which the inner ring of the bearing is fitted onto the tubular body.

Such an end-of-travel stop additionally forms a stop for limiting the axial movement of the tubular element within the bearing when the shaft and the tubular element are urged to move in the direction of an outlet of the housing.

According to one embodiment of the invention, the rotary element is a pulley with two flanges and a body, the body assuming the shape of a sleeve, preferably a blind sleeve, slipped over said shaft.

According to one embodiment of the invention, the inner ring of the bearing is inserted between the outer peripheral shoulder of the tubular body and an end of the sleeve constituting the body of the pulley forming the rotary element.

The inner ring can thus be sandwiched between the outer peripheral shoulder of the tubular body and an end of the sleeve constituting the body of the pulley forming the rotary element.

According to one embodiment of the invention, the body, which assumes the shape of a blind sleeve, of the pulley constituting the rotary element is provided, on the blind end side, with an axial through-drilling arranged in correspondence with an axial bore of the blind tubular body to form a passage for receiving a member, such as a screw, for connecting the rotary element to the tubular body.

The rotary element and the tubular body can therefore be secured to one another by screwing.

According to one embodiment, the rotary element and the tubular body are mounted so as to be locked in rotation by cooperation of complementary geometrical shapes.

Preferably, the shaft is a worm screw in engagement with a toothed wheel or a pinion housed within the housing.

Another subject of the invention is a machine characterized in that it is equipped with a transmission housing conforming to that described above.

DESCRIPTION OF THE DRAWINGS

The invention will be clearly understood on reading the following description of exemplary embodiments with reference to the appended drawings, in which:

FIG. 5 represents a sectional view in the assembled position of the elements constituting it of the shaft/rotary element/tubular body assembly, as represented in FIG. 4a.

DETAILED DESCRIPTION

Figure 1:
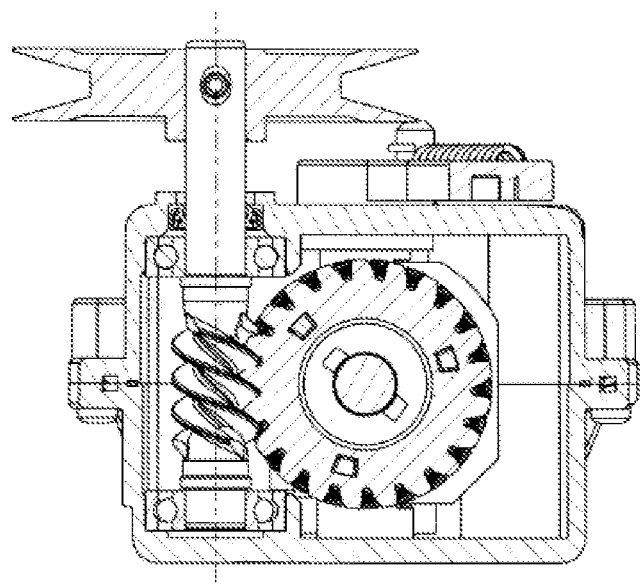
FIG. 1 represents a sectional view of a transmission housing according to the prior art.
Figure 2:
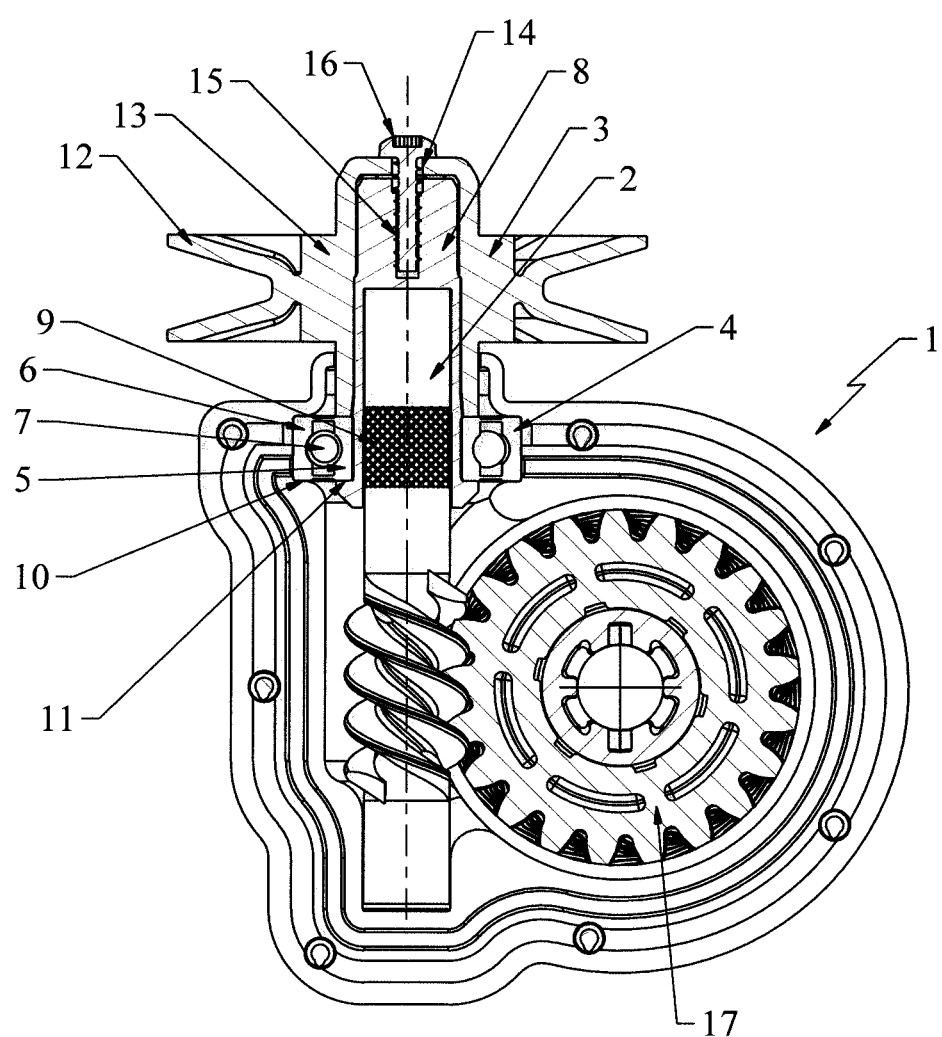
FIG. 2 represents a sectional view of a transmission housing according to the invention.
Figure 3:
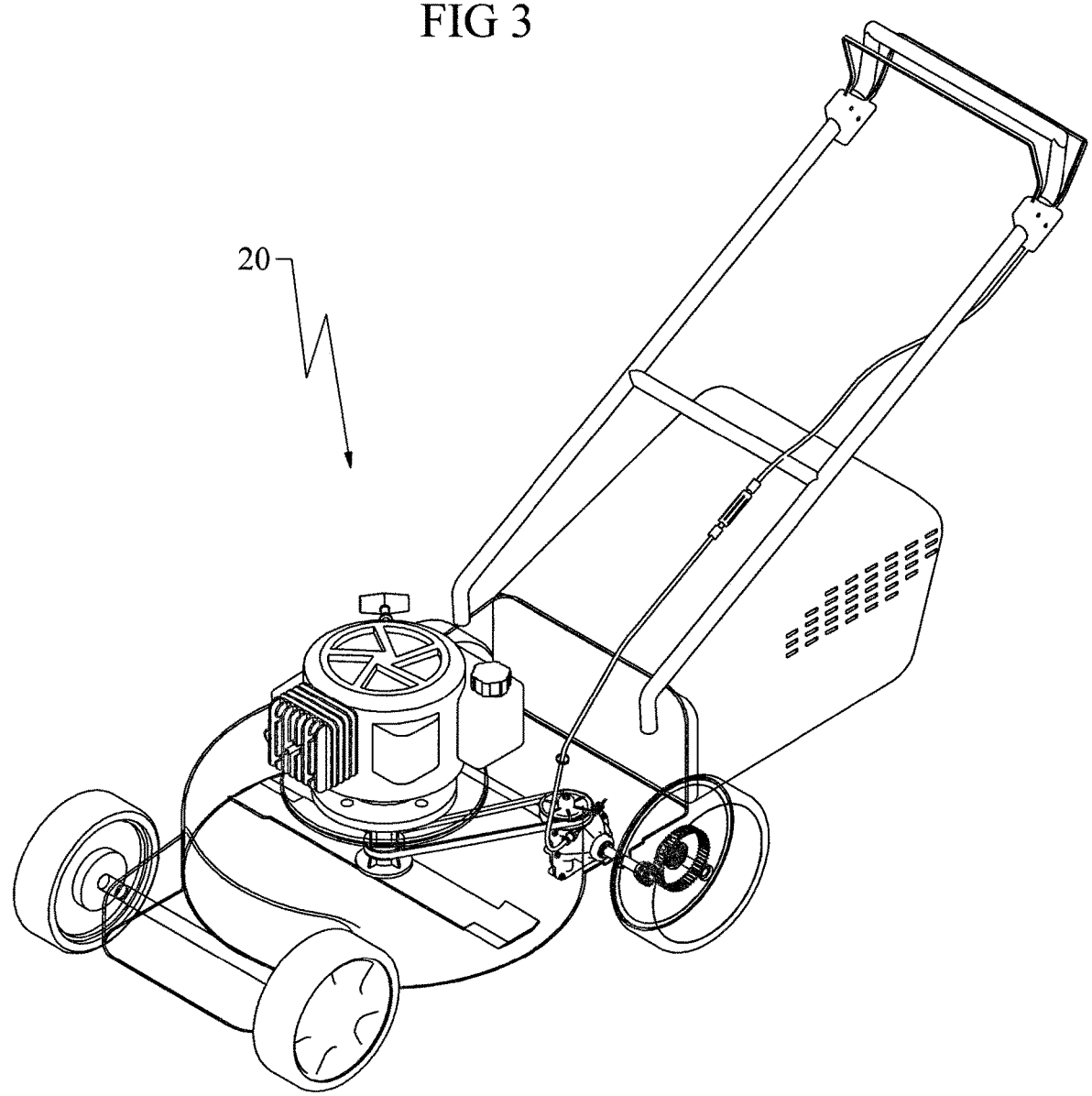
FIG. 3 represents a perspective view of a machine equipped with a transmission housing according to the invention.
Figure 4:
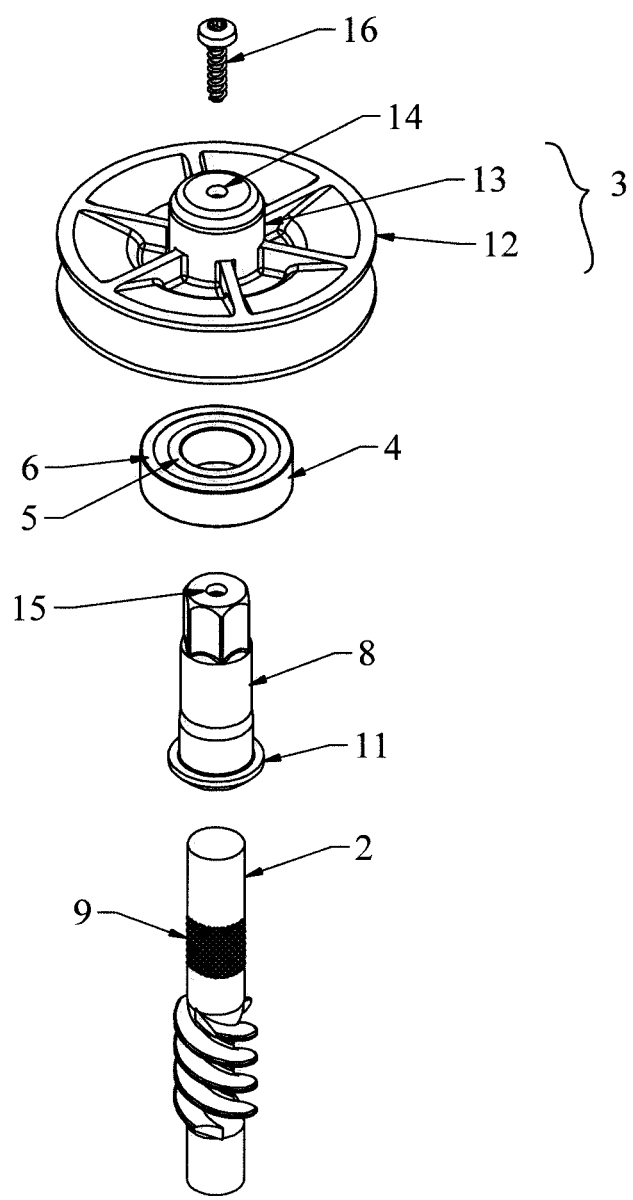
FIG. 4a represents a perspective view in an exploded position of the elements constituting it of the shaft/rotary element/tubular body assembly.
FIGS. 4b and 4c represent, in the form of schematic sectional views located in the construction region, the mounting of the elements on the shaft.
Figure 5:
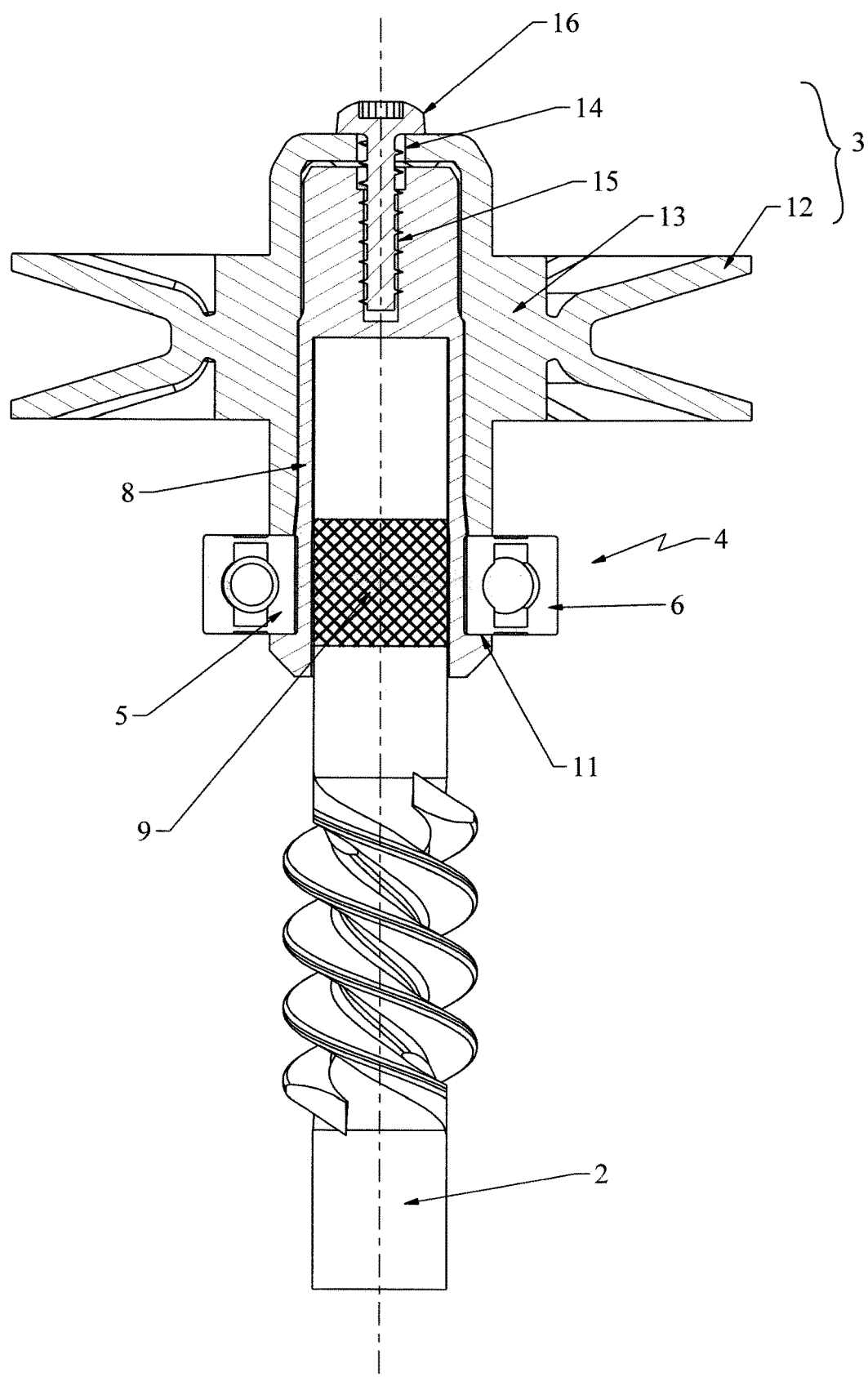

As mentioned above, one subject of the invention is a transmission housing 1.

In the example represented, this transmission housing 1 is mounted on a self-propelled wheeled machine, in this case a lawnmower.

This transmission housing 1 comprises a shaft 2 housed at least partially within the housing. This transmission housing 1 further comprises, mounted on said shaft 2, a rotary element 3, in this case a pulley in the example represented.

The rotational movement of the pulley is transmitted to the shaft 2. This shaft 2 is an input shaft formed by a worm screw in engagement with a toothed wheel 17 housed within the housing and mounted so as to be locked in rotation with a shaft which forms the output shaft of the housing.

In the example represented, this output shaft forms the shaft for rotating the wheels of the machine 20.

The worm screw/toothed wheel pair could have been replaced by a pair of bevel gears, for example, without departing from the field of the invention.

The shaft 2, which forms the input shaft of the housing 1, therefore comprises, mounted on said shaft 2, a rotary element 3 which forms a pulley as mentioned above, and a bearing 4. The bearing 4 is a ball bearing which comprises an inner ring 5 and an outer ring 6 which are coaxial and separated from one another by rolling members 7. The rolling members 7 can be balls, needles or any other equivalent element.

In the example represented, the bearing 4 is arranged within the housing 1. In particular, this bearing 4 is immobilized axially within the housing 1. To this end, the outer ring 6 of the bearing 4 is, for axial immobilization of the bearing 4 within the housing 1, arranged in an axially fixed manner within a receptacle 10 of the housing 1.

This receptacle 10 here takes the form of an annular receptacle.

The transmission housing 1 further comprises a tubular body 8 which is deformable under the action of a pressure. This tubular body 8 is preferably made of synthetic material, in this case plastic, in particular polyamide.

The tubular body 8, which is deformable under the action of a pressure exerted by the ring 5 in the state in which the ring is fitted onto said body, has a compressive deformation capability that is greater than that of the inner ring of the bearing and of the shaft. The synthetic material is therefore a deformable material which is preferably elastically deformable under pressure.

This tubular body 8 is slipped over the shaft 2 and interposed partially between the rotary element 3 and the shaft 2.

In the example represented, this tubular body 8 is blind and is provided, at its end opposed to its blind end, with an outer peripheral shoulder 11 whose function will be described below. This tubular body 8 is also provided, on the blind end side, with an axial bore 15 whose function will be described below.

In the example represented, the tubular body 8 has, over part of its length, a conical shape with the small base of the cone arranged on the blind end side and the large base of the cone arranged on the opposite end side, that is to say on the outer peripheral shoulder 11 side of the tubular body 8.

This conical shape extends from the end provided with the outer peripheral shoulder 11 of the body 8 in the direction of the opposite end of the tubular body at least at the portion of the tubular body 8 that is surrounded by the bearing 4. Specifically, the tubular body 8 is slipped over the shaft 2, and the bearing 4 is for its part slipped over the tubular body 8 once the tubular body 8 is in place. Thus, the tubular body 8 is held locked in rotation with the shaft 2 and axially on the shaft 2 by the inner ring 5, termed constrictive ring, of the bearing 4, this inner ring 5 being force-fitted onto the tubular body 8. The inner ring 5 is termed constrictive since it exerts a circular pressure on the tubular body 8 which for its part is thus pressed onto the shaft 2 to allow the tubular body 8 to form an assembly with the shaft 2 that is locked in rotation.

To complete this rotationally and translationally locked mounting, the shaft 2 has on the outside, at least at its portion surrounded by the bearing 4, recessed and/or raised patterns 9. These recessed and/or raised patterns 9 are produced by knurling the shaft 2. In this case, this knurling, for which no precision is required, forms scores on the outer surface of the shaft 2, and the inner face of the tubular body 8 is pressed by the inner ring of the bearing 4 against these scores so as to provide strong adhesion by bearing contact between the tubular body 8 and the shaft 2.

In the examples represented, the inner ring 5 of the bearing 4 is force-fitted onto the tubular body 8 until it comes to bear on the outer peripheral shoulder 11 of the tubular body 8.

The rotary element 3 is, for its part, a pulley with two flanges 12 and a body 13. In the example represented, the flanges 12 and the body 13 are made in one piece. In a variant, there could be provision for at least one of the flanges 12 to be added onto the body 13.

This body 13 assumes the shape of a sleeve slipped over the shaft 2. In the example represented, this sleeve is blind. In the mounted state of the bearing 4 and of the rotary element 3 on the shaft 2, the inner ring 5 of the bearing 4 is inserted between the outer peripheral shoulder 11 of the tubular body 8 and an end of the sleeve constituting the body 13 of the pulley forming the rotary element 3.

The blind tubular body 8 is, for its part, interposed partially between the rotary element 3 and the shaft 2, in particular between the body 13, which assumes the shape of a sleeve, of the pulley and the shaft 2. This tubular body 8 and the rotary element 3 are mounted so as to be locked in rotation by cooperation of complementary geometrical shapes. To this end, the tubular body 8 is provided on the outside with axial splines able to cooperate with axial grooves formed on the inner face of the sleeve constituting the body 13 of the pulley forming the rotary element 3.

To complete the assembly, the rotary element 3 and the tubular body 8 are secured to one another by screwing. To this end, the body 13, which assumes the shape of a blind sleeve, of the pulley constituting the rotary element 3 is provided, on the blind end side, with a through-drilling 14 arranged in correspondence with an axial bore 15 of the blind tubular body 8 to form a passage for receiving a member 16 for connecting the rotary element 3 to the tubular body 8, this connection member 16 here being formed by a screw.

The mounting of the various elements on the shaft 2 occurs as follows:

With the shaft 2 having been provided beforehand with recessed and/or raised patterns on its outer surface, for example by knurling, the blind tubular body 8 is slipped over the shaft 2. The bearing 4 is then force-fitted onto said tubular body 8. The fitting occurs, in the example represented, such that the outer peripheral shoulder 11 of the tubular body 8 forms an end-of-travel stop for fitting the inner ring 5 of the bearing 4.

This inner ring 5 of the bearing provides a radial pressure on the tubular body 8 which, itself, is thus pressed onto the shaft 2, in particular at recessed or projecting patterns of the shaft 2. The tubular body 8 and the shaft 2 are now locked in rotation and in translation.

The rotary element 3 is then slipped over the shaft 2 until the inner ring of the bearing 4 is sandwiched between the outer peripheral shoulder 11 of the tubular body 8 and the free end of the body 13 of the pulley forming the rotary element 3.

The grooves of the rotary element 3 ensure that the rotary element 3 is mounted locked in rotation with the tubular body 8 by cooperation of said grooves with the splines of the tubular body 8.

Finally, the screw is introduced into the through-drilling 14 of the body 13 of the pulley and into the preferably internally threaded bore 15 of the tubular body 8.

The mounting of the elements on the shaft 2 is finished, and the shaft 2 can be arranged in the housing 1 such that the bearing 4 mounted on the shaft 2 is inserted into a receptacle of the housing 1.

It should be noted that, in the state in which it is at least partially inserted into the housing 1, the shaft 2 extends parallel to the assembly plane of the shells which, in the assembled state, form the housing.

The invention claimed is:

1. A transmission housing comprising:
   a shaft housed at least partially within the housing and,
   mounted on said shaft, at least one rotary element and a bearing,
   the bearing having an inner ring and an outer ring which are coaxial and separated from one another by rolling members,
   the housing additionally having a blind or through tubular body mounted on the shaft and interposed at least partially between the shaft and the rotary element,
   this rotary element being mounted so as to be locked in rotation with the tubular body,
   wherein the rotary element, which is coaxial with the shaft, is a pulley with two flanges and a body, slipped over the shaft, and in that the tubular body is held locked in rotation with the shaft by the inner ring, termed constrictive ring, of the bearing, which inner ring is force-fitted onto said tubular body.

2. The transmission housing as claimed in claim 1, wherein the shaft has on the outside, at least at its portion surrounded by the bearing, recessed and/or raised patterns.

3. The transmission housing as claimed in either of claim 1, wherein the bearing is immobilized axially within the housing.

4. The transmission housing as claimed in claim 3, wherein the outer ring of the bearing is, for axial immobilization of the bearing within the housing, arranged in an axially fixed manner within a receptacle of the housing.

5. The transmission housing as claimed in claim 1, wherein the tubular body is provided at one of its ends with an outer peripheral shoulder able to form an end-of-travel stop for fitting the inner ring of the bearing, in the state in which the inner ring of the bearing is fitted onto the tubular body.

6. The transmission housing as claimed in claim 5,
   and wherein the inner ring of the bearing is inserted between the outer peripheral shoulder of the tubular body and an end of the sleeve constituting the body of the pulley forming the rotary element.

7. The transmission housing as claimed in claim 1, wherein the body of the pulley has the shape of a blind sleeve.

8. The transmission housing as claimed in claim 7, wherein the body, which assumes the shape of a blind sleeve, of the pulley constituting the rotary element is provided, on the blind end side, with an axial through-drilling arranged in correspondence with an axial bore of the blind tubular body to form a passage for receiving a screw, for connecting the rotary element to the tubular body.

9. The transmission housing as claimed in claim 1, wherein the rotary element and the tubular body are mounted so as to be locked in rotation by cooperation of complementary geometrical shapes.

10. The transmission housing as claimed in claim 1, wherein the shaft is a worm screw in engagement with a toothed wheel or a pinion housed within the housing.

11. A machine equipped with a transmission housing as claimed in claim 1.

* * * * *